Dec. 11, 1956  W. T. BRADLEY  2,773,727
RECORD HOLDER
Filed April 27, 1953  2 Sheets-Sheet 2
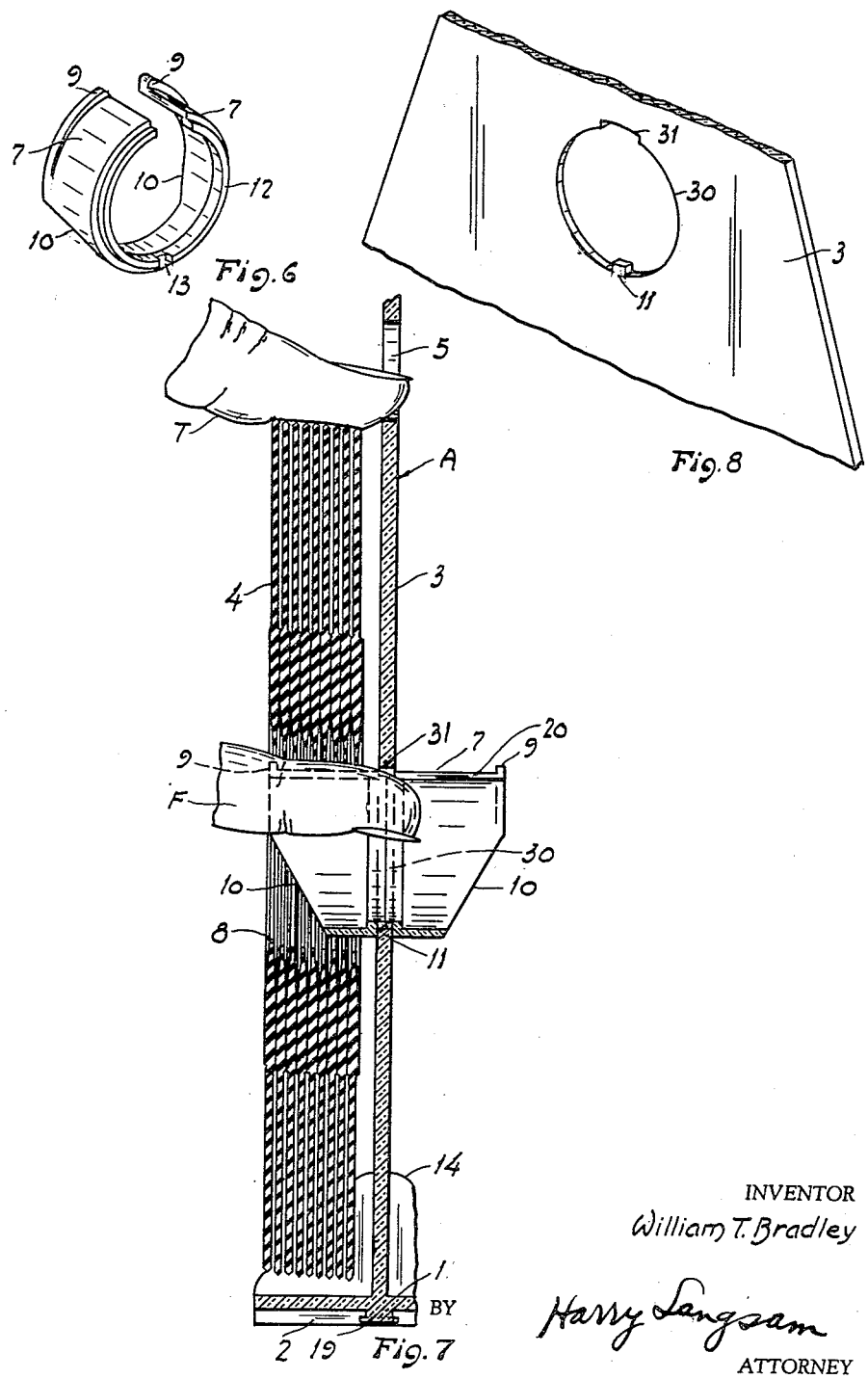
INVENTOR
William T. Bradley
BY Harry Langsam
ATTORNEY

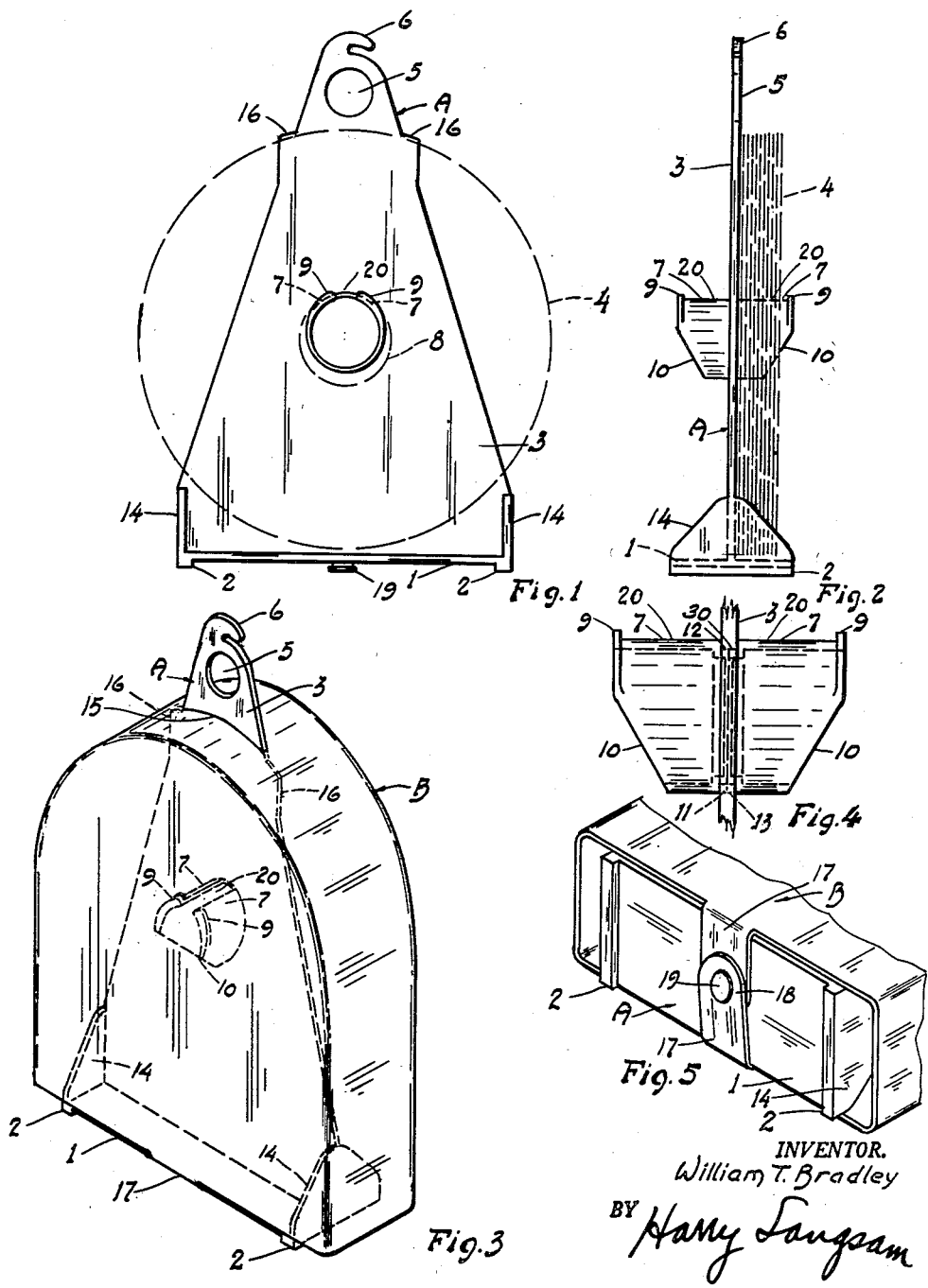

United States Patent Office 2,773,727
Patented Dec. 11, 1956

2,773,727

RECORD HOLDER

William T. Bradley, Philadelphia, Pa.

Application April 27, 1953, Serial No. 351,329

3 Claims. (Cl. 312—10)

My invention relates to supporting, carrying and storing holder for disk type recordings of speech and music.

It is an object of my invention to utilize a flat support member attached to a base, disk-recording support members projecting from both sides of the flat support member arranged to engage a circular hole—a feature of disk type recordings—thereby supporting the disk-recordings in definite space relationship to the disk-recording supporting, carrying, and storing device and in such a way as to avoid strains on or distortion of the disk-recordings.

Another object of my invention is to provide a disk-recording supporting, carrying, and storing holder over which an enveloping shield can be placed to protect the disk-recordings from dust, injury, or harm from the elements. The enveloping shield is arranged to be placed over the disk-recording supporting, carrying, and storing holder; the shield interfitting with the carrying feature of the disk-recording supporting, carrying, and storing device and securely attached to the device.

Another object of my invention is to provide a disk-recording supporting, carrying, and storage holder that has few parts and which may be molded, stamped, or cast.

Another object of my invention is to provide a disk-recording supporting, carrying, and storing holder that readily and conveniently lends itself to the efficient transportation, storing, and protecting of disk-recordings and at the same time present a neat and pleasing appearance.

Another object of my invention is to construct a disk-recording supporting, carrying, and storing device that is fabricated of materials of different colors or finished in different colors so that the user may file different type disk-recordings on disk-recording supporting, carrying, and storing devices of distinctive colors.

Other objects of my invention are to provide an improved device of the character described which is easily and economically produced, which is sturdy and compact in construction, and which provides the maximum protection both physical and mechanical to the disk-recording.

With the above and related objects in view, my invention consists in details of construction as hereinafter shall be described, the description will be more readily understood when the description is read in conjunction with the accompanying drawings, in which:

Fig. 1 is a front elevational view of a disk-recording supporting, carrying, and storing holder embodying my invention.

Fig. 2 is an end elevational view of the disk-recording supporting, carrying, and storing holder.

Fig. 3 is an isometric view of the disk-recording supporting, carrying, and storing holder with the enveloping protection shield in place.

Fig. 4 is a partial end view of the disk-recording supporting, carrying, and storing holder showing the flat central support member and the two projecting disk-recording support members.

Fig. 5 is a partial bottom view of the disk-recording supporting, carrying, and storing holder showing the securing of the enveloping shield.

Fig. 6 is an isometric view of the disk-recording support member.

Fig. 7 is a sectional view of the disk-recording support, carrying, and storing holder showing the disk-recordings being removed from the holder by the finger F and thumb T of the operator's hand.

Fig. 8 is a fragmental isometric view of the vertical support member of the record holder, showing details of the hole arranged to receive two disk-recording support members.

Referring in greater detail to the drawing I disclose a disk-recording supporting, carrying, and storing holder A integrally united, that may be formed of stamped metal, cast metal, or moulded of a phenolic condensate product.

In Figs. 1 and 2 I show the disk-recording supporting, carrying, and storing holder comprised of a substantially flat base surface 1, whereon integral support members 2 are formed to act as feet or supports for the device; extending vertically and along the longitudinal axis of the base member is a flat support member 3. The flat support member 3 being integral with the base 1 and extending upward from the base member 1 and terminating at a point above the disk-recordings 4 when the disk-recordings are in place on the device; the upper portion of the flat support member 3 is pierced with a hole 5, said hole being large enough to receive a finger of the hand, thereby providing a carrying means for the device. The hole 5 is also a means for supporting the device from a projection or hook (not shown).

At the upper end of the flat support member 3 is a hook-like appendage 6, said appendage is arranged to interfit with a loop or hook (not shown) when the device is stored suspended in parallel arrangement with other devices of this same construction. Projecting outwardly from the sides of the flat support member 3, and on opposite sides of said support member, are duplicate disk-recording support members 7. The disk-recording supports being curved so that the inner curved record supporting surface is less in vertical and horizontal dimension than the inside diameter dimension of the hole 8 in the disk-recordings, said disk-recording support member 7 being curved is arranged to extend outwardly a sufficient distance to support a multiplicity of disk-recordings 4. A rib 9 formed on the outer ends of the disk-recording support members 7 and extending slightly above the upper surface of said disk-recording support members is provided. The function of said rib is to prevent the disk-recordings from falling off the support 7 in definite space relationship on the support members 7—7. The disk-recording supporting members are beveled 10 on their outer lower side to permit ready removal or placing of the disk-recordings.

An elongated opening 20 in the top and extending inward from the outer end of the disk-recording support members 7—7 is provided to permit the user to insert his finger into the disk-recording support member and engage the inner curved edge of the disk-recordings in order to raise and remove the disk-recordings from the holders 7—7; and also place the disk-recordings on the holders 7—7; the elongated opening 20 thus facilitating the placing or removal of the disk-recordings; the aforementioned construction also permits the handling of the disk-recordings in the manner recommended by the manufacturer of the disk-recordings.

Reinforcing members 14—14 are provided at each end of the base 1 forming an integral part of the base 1 and the flat support member 3 thus insuring rigidity between the base and the flat support member.

In the embodiment shown in the drawings the disk-recording support members 7 are shown assembled with the flat support member 3, a hole 30 with a projecting key 11 in the flat support member is arranged to receive a circular raised portion 12 and keyway 13 on the inside face of the disk-recording support member 7; this arrangement is provided to assure definite positioning of the disk-recording support member 7 in the flat support member 3. A recessed wall 31 is provided in the upper portion of the curved wall forming the hole 30 to provide clearance for the finger, whereby the disk-recordings may be easily removed from or placed upon the disk-recording support members 7—7 see Fig. 7.

In other embodiments, the flat support member and the disk-recording support members are formed as a single integral unit.

An enveloping shield B, fabricated of flexible plastic material or cloth, formed to pass down over and to enclose the disk-recording supporting, carrying, and storing device, has a slotted hole 15 arranged to interfit with the flat support member 3, and is definitely positioned by projecting stops 16—16 projecting from the edges of the flat support member 3. Tabs 17—17 formed as an extension of the lower edge of the enveloping shield B are pierced with holes 18; said holes interfit with a projecting headed knob 19 formed on the bottom of the base 1 of the disk-recording supporting, carrying and storing device. The arrangement of the shield B slotted hole 15, stops 16 on flat support member 3, tabs 17 with holes 18, interfitting with knob 19 on bottom of base all tend to definitely position the enveloping shield B on the disk-recording supporting, carrying, and storing device whether the device contains disk-recordings of the maximum or minimum number or not, also the inner upper surface of the enveloping shield B, being in contact with the upper curved edge of the disk-recordings, when the disk-recordings are in place on the holders 7—7, cooperates with the ribs 9—9 on the holders 7—7 to retain the disk-recordings on the holders 7—7 when the shield B is in place on the record holder.

It is to be observed that in the embodiment of my invention, as illustrated and described, that the device may be molded with few parts from synthetic non-metallic products or from metallic products. With slight modification in the structural details of the device, it could also be fabricated from two identical metal stampings.

As frequently happens in homes and stores where disk-recordings are used and sold, great difficulty is experienced in maintaining an orderly handling of the disk-recordings. With the holder as hereinabove described, order, ease of handling, and storing the disk-recordings would result.

Although my invention has been described in considerable detail, such description is intended as illustrative rather than limiting, as the invention may be variously embodied and the scope is to be determined as claimed.

I claim:

1. A disk-recordings support, carrying, and storing device comprising a horizontally extending rectangular base member, a vertically extending support member fixedly attached to said base member along the long axis of said base member, horizontally extending tubular disk-recordings support members fixedly attached to said vertically extending support member and extending to each side thereof and being adapted to support a multiplicity of vertically positioned disk-recordings, an upwardly extending rib on the upper outer end of said tubular disk-recordings support member and a bevel on the lower outer end of said tubular disk-recording support members, said bevel being adapted to permit vertical movement of said disk recordings in space relationship to said tubular disk recordings support members for ready removal and placing of disk recordings on said tubular disk-recordings support members over said vertically extending rib.

2. A disk-recordings support, carrying, and storing device comprising a horizontally extending rectangular base member, a vertically extending support member fixedly attached to said base member along the long axis of said base member, a horizontally extending tubular disk-recordings support member fixedly attached to said vertically extending support member and extending to each side thereof and being adapted to support a multiplicity of vertically extending disk-recordings, an upwardly extending rib on the upper outer end of said tubular disk-recordings support member, an enveloping shield positioned to enclose that portion of the disk-recordings supporting, carrying and storing device that supports and positions the disk-recordings on the device and the disk recordings thereon, a slotted hole in the upper side of said enveloping shield, said slotted hole positioned to interfit with the upper portion of said vertically extending support member, the interfitting of said slotted hole in the enveloping shield and said upper portion of the vertically extending support member providing means to definitely position said enveloping shield on said disk-recordings supporting, carrying and storing device and assist said shield to position, secure and protect disk-recordings positioned on said tubular support of said disk-recordings positioning, carrying and storing device.

3. A disk-recordings support, carrying, and storing device comprising a horizontally extended rectangular base member, a vertically extending support member fixedly attached to said base member along the long axis of said base member, a horizontally extending tubular disk recordings support member fixedly attached to said vertically extending support member and being adapted to support a multiplicity of vertically positioned disk recordings, an upwardly extending rib on the upper outer end of said tubular disk-recordings support member and a bevel on the lower outer end of said tubular disk-recordings support member, elongated openings in the upper portion of the horizontally extending tubular disk-recordings support member, said openings providing means whereby the user is permitted to insert a finger within said tubular support members and engage the inner curved edge of the disk-recordings supported by said tubular support member by way of said elongated openings to raise said disk-recordings for movement over said upwardly extending rib, for ready removal from and placing of disk-recordings on said disk-recordings support.

References Cited in the file of this patent

UNITED STATES PATENTS

| | | |
|---|---|---|
| 1,448,892 | Wiberg | Mar. 20, 1923 |
| 1,505,797 | Olstad | Aug. 19, 1924 |
| 2,278,214 | Pearson | Mar. 31, 1942 |
| 2,392,996 | Poirier | Jan. 15, 1946 |
| 2,486,678 | Rashko | Nov. 1, 1949 |
| 2,677,585 | La Voy | May 4, 1954 |
| 2,688,490 | Schumaker | Sept. 7, 1954 |

FOREIGN PATENTS

| | | |
|---|---|---|
| 653,083 | Great Britain | May 9, 1951 |